No. 724,340. PATENTED MAR. 31, 1903.
G. W. SHEEHAN.
HORSE HITCHING DEVICE.
APPLICATION FILED AUG. 27, 1902.
NO MODEL.
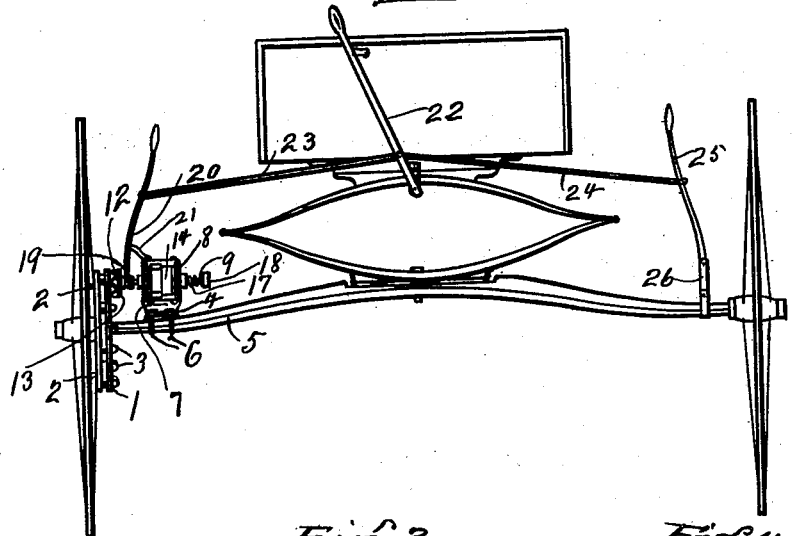
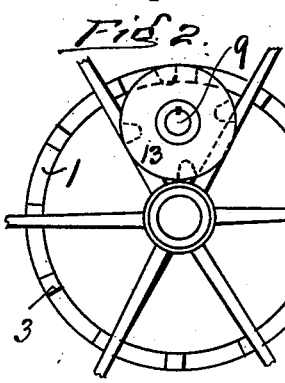
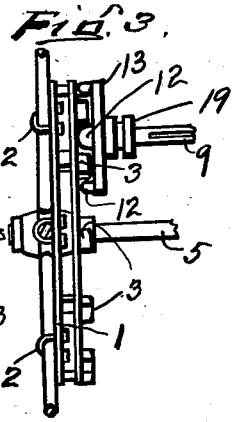
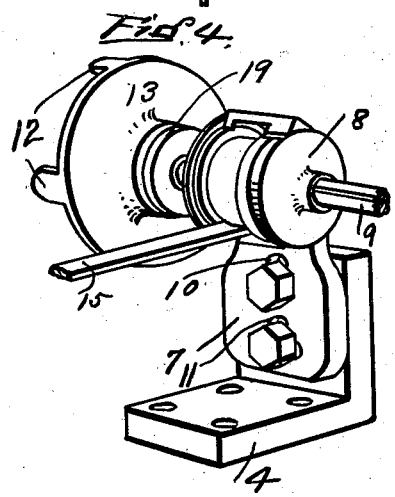
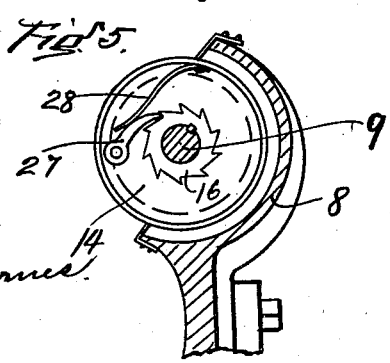
WITNESSES:
INVENTOR
George W. Sheehan
By Jn. W. Bond
ATTY.

UNITED STATES PATENT OFFICE.

GEORGE W. SHEEHAN, OF SALEM, OHIO.

HORSE-HITCHING DEVICE.

SPECIFICATION forming part of Letters Patent No. 724,340, dated March 31, 1903.

Application filed August 27, 1902. Serial No. 121,194. (No model.)

*To all whom it may concern:*

Be it known that I, GEORGE W. SHEEHAN, a citizen of the United States, residing at Salem, in the county of Columbiana and State of Ohio, have invented certain new and useful Improvements in Horse-Hitching Devices; and I do hereby declare that the following is a full, clear, and exact description of the same, reference being had to the annexed drawings, making a part of this specification, and to the figures of reference marked thereon, in which—

Figure 1 is a view showing the front or forward axle of a vehicle and illustrating my improved device attached thereto. Fig. 2 is a view showing a portion of a vehicle-wheel and illustrating the toothed band or ring connected thereto, also showing a side view of the drum-winding toothed disk. Fig. 3 is an edge view showing a portion of a vehicle-wheel, also showing the toothed band or ring connected thereto, also showing an edge view of the drum-winding tooth-disk. Fig. 4 is a perspective view of the attaching-bracket, its head, showing the different parts properly assembled, except the driving band or ring. Fig. 5 is an end view showing the head in section and illustrating the ratchet mechanism.

The present invention has relation to horse-hitching devices; and it consists in the novel construction hereinafter described, and particularly pointed out in the claim.

Similar numerals of reference indicate corresponding parts in all the figures of the drawings.

In the accompanying drawings, 1 represents the toothed band or ring, which is connected to the spokes of one of the forward wheels by means of suitable clips 2. The band 1 is provided with the teeth 3, which teeth are located upon the inner face of the band and are for the purpose hereinafter described.

The bracket 4 is connected to the axle 5 by means of suitable clips 6, and to the bracket 4 is adjustably attached the flange 7, which flange is formed integral with the shell 8, and for the purpose of providing proper adjustment for the shaft 9, together with the different parts connected thereto, the flange 7 is provided with the elongated slots 10 and 11, the slot 11 being extended in each direction, so as to provide a means to adjust the shell 8 and the shaft 9 at right angles to a vertical line through the toothed band or ring 1 and at the same time to bring the teeth 3 and the teeth 12 of the toothed disk 13 into proper relation with each other, this being very desirable to compensate for any variation that may exist between the different kinds and styles of axles; as it will be understood that the shaft 9, together with its parts, should be held in proper relative position with the toothed band or ring 1 regardless of the position of the axle or any curvature that the axle may have.

Within the shell 8 is located the winding-drum 14, which winding-drum is loosely mounted upon the shaft 9, and in order to cause said drum to rotate with the shaft 9 when it is desired to wind the hitching-strap 15 around the drum the ratchet-wheel 16 is fixed to the shaft 9, but in such a manner that the shaft 9 can move endwise through the ratchet-wheel.

For the purpose of normally holding the toothed disk 13 out of engagement with the toothed band or ring 1 the spring 17 is interposed between the face of the shell 8 and the head 18, located upon the inner end of the shaft 9.

For the purpose of bringing the toothed disk 13 into engagement with the tooth-band 1 the grooved collar 19 is provided, to which grooved collar is attached an ordinary yoke-lever 20, which lever is pivotally attached to the arm 21 and is extended upward, so that it may be reached by the hand of a driver, and for the purpose of providing a means for operating the toothed disk and bring it in and out of engagement a center lever, such as 22, may be employed, to which the connecting-bars 23 and 24 are attached, one to the lever 20 and the other to the lever 25, said lever 25 being located upon the opposite side from that of the lever 20. The lever 25 is pivoted to the bracket 26.

The construction for moving the toothed disk in and out of engagement may be varied without departing from the nature of my invention.

It will be understood that when the toothed disk 13 is brought into engagement the shaft 9 will be rotated and the hitching-strap 15 wound upon the winding-drum 14, said winding-drum being rotated by means of the ratchet-wheel 16 and the detent 27, said detent 27 being fixed to the end of the winding-drum, and for the purpose of holding the detent in proper engagement with the ratchet-wheel 16 the spring 28 is provided.

It will be noticed that by my peculiar arrangement a backward movement of the wheel will not impart a rotary movement, as the ratchet-wheel 16 will rotate independent of the winding-drum in a backward direction.

It will be understood that the connecting-bars 23 and 24 should be so attached to the lever 22 and to the operating-levers 20 and 25 that there will be no interference with said connecting-bars when the front or forward axle is turned at an angle to the rear axle, this being accomplished by placing the connecting-bars 23 and 24 above the forward spring. It will of course be understood that an ordinary fifth-wheel is to be employed; but I have simply illustrated an ordinary king-bolt to form the pivotal point of the front or forward axle, together with the different parts attached thereto. This feature of course forms no particular part of the present invention. It will also be understood that the winding-drum 14 should be properly inclosed, except at the point where the strap 15 is extended forward. This feature is not illustrated, as it may be of any kind or style, as the only object in inclosing the drum is to prevent dirt or any foreign substance from interfering with the location of the winding-drum.

For the purpose of connecting the flange 7 to the shell suitable screws or bolts may be employed. In the drawings I have illustrated lug-bolts; but it will be understood that any means may be employed to make the connection without departing from the nature of my invention.

In the drawings I have illustrated the strap-winding device attached to but one wheel of the vehicle; but it will be understood that the device here shown may be duplicated and attached to both wheels, this being desirable in some instances, especially in preventing the horse from turning.

Having fully described my invention, what I claim as new, and desire to secure by Letters Patent, is—

In a horse-hitching device, the combination of a toothed ring fixed to a vehicle-wheel, a bracket secured to the axle of a vehicle, an arm provided with a casing, said arm adjustably connected to the bracket, a shaft, a toothed disk mounted thereon, a ratchet-wheel mounted upon the shaft and the shaft journaled in the housing and capable of longitudinal movement, a winding-drum loosely mounted upon the shaft, a detent secured to the winding-drum, and a spring located in operative contact with the detent, a spring to normally hold the toothed disk out of engagement, and means for connecting and disconnecting the toothed disk from the toothed band, substantially as and for the purpose specified.

In testimony that I claim the above I have hereunto subscribed my name in the presence of two witnesses.

GEORGE W. SHEEHAN.

Witnesses:
J. B. BAKER,
NINA E. BENTLEY.